(No Model.) 10 Sheets—Sheet 1.

W. PORTEOUS.
COMBINED REAMING AND TAPPING MACHINE.

No. 457,916. Patented Aug. 18, 1891.

Witnesses:
J. Thomson Cross
Charles Billow

Inventor:
Wm Porteous
per Peck & Reitor
Attorneys.

(No Model.)

W. PORTEOUS.
COMBINED REAMING AND TAPPING MACHINE.

(No Model.) 10 Sheets—Sheet 6.

W. PORTEOUS.
COMBINED REAMING AND TAPPING MACHINE.

No. 457,916. Patented Aug. 18, 1891.

Witnesses.
J. Thomson Cross
Charles Billow.

Inventor.
Wm Porteous
by Peck & Rector
Attorneys.

(No Model.) 10 Sheets—Sheet 7.

W. PORTEOUS.
COMBINED REAMING AND TAPPING MACHINE.

No. 457,916. Patented Aug. 18, 1891.

Witnesses.
J. Thomson Cross
Charles Bellow

Inventor:
Wm Porteous
per Peck & Rector
Attorneys.

THE NORRIS PETERS CO., PHOTO-LITHO., WASHINGTON, D. C.

(No Model.) 10 Sheets—Sheet 8.
W. PORTEOUS.
COMBINED REAMING AND TAPPING MACHINE.

No. 457,916. Patented Aug. 18, 1891.

Witnesses.
J. Thomson Cross
Charles Billow

Inventor:
Wm Porteous
per Peck & Rector
Attorneys.

(No Model.) 10 Sheets—Sheet 9.

W. PORTEOUS.
COMBINED REAMING AND TAPPING MACHINE.

No. 457,916. Patented Aug. 18, 1891.

Witnesses.
J. Thomson Cross
Charles Billon.

Inventor.
Wm Porteous
per Peck & Rector
Attorneys.

(No Model.) 10 Sheets—Sheet 10.

W. PORTEOUS.
COMBINED REAMING AND TAPPING MACHINE.

No. 457,916. Patented Aug. 18, 1891.

UNITED STATES PATENT OFFICE.

WILLIAM PORTEOUS, OF ELMWOOD PLACE, OHIO.

COMBINED REAMING AND TAPPING MACHINE.

SPECIFICATION forming part of Letters Patent No. 457,916, dated August 18, 1891.

Application filed July 7, 1890. Serial No. 357,958. (No model.)

*To all whom it may concern:*

Be it known that I, WILLIAM PORTEOUS, a citizen of the United States, residing at Elmwood Place, in the county of Hamilton and State of Ohio, have invented certain new and useful Improvements in Combined Reaming and Tapping Machines, of which the following is a full, clear, and exact description, reference being had to the accompanying drawings, forming part of this specification.

My invention relates to machines for reaming and tapping cocks, valves, and other brass fittings; and it has for its object the improved construction of such machines, whereby their efficiency is increased and whereby they are rendered as nearly automatic as possible.

The novelty of my invention will be hereinafter set forth, and specifically pointed out in the claims.

In the accompanying drawings, Figure 1, Sheet 1, is an elevation of a machine embodying my invention. Fig. 6, Sheet 5, is an enlarged elevation, partly in section, taken through the dotted line $x'\ x'$ of Fig. 2 and looking toward the center of the machine. Fig. 6$^a$ is a detail view showing a modification. Fig. 7, Sheet 5, is a detail plan view through the dotted line $y'\ y'$ of Fig. 6.

The same letters of reference are used to indicate identical parts in all the figures.

The machine, which is designed for the finishing of brass fittings—such as cocks, valves, and the like—by subjecting them to the action of cutters—such as reamers, taps, and dies—may, in a general way, be said to consist of a central monitor-head provided with work-holding chucks for presenting a number of pieces—in this instance six—of the work to the simultaneous action of as many radial and horizontal mandrels carrying cutting-tools which are simultaneously advanced to do their work upon the fittings, which are held stationary, and then are retracted. After the retraction of the mandrels the monitor is partially and automatically rotated, and at proper times by the same action the work-holding chucks are partially rotated, so as to present another side of the six pieces of work to the next advance of the mandrels, and so on. Thus it will be seen that each piece of work is brought successively under the action of each of the cutting-tools until all of the sides have been acted on, whereupon the chuck carrying the finished piece of work is brought opposite a place where there is no mandrel, and the finished piece is removed and a fresh casting put in its place, to be dressed in the same manner. With the exception of the introduction and removal of the fittings, all of the movements of the machine are automatic and its operation is continuous. With this preliminary description of the machine, I will now proceed to describe how it is constructed and how it operates.

Figure 1:
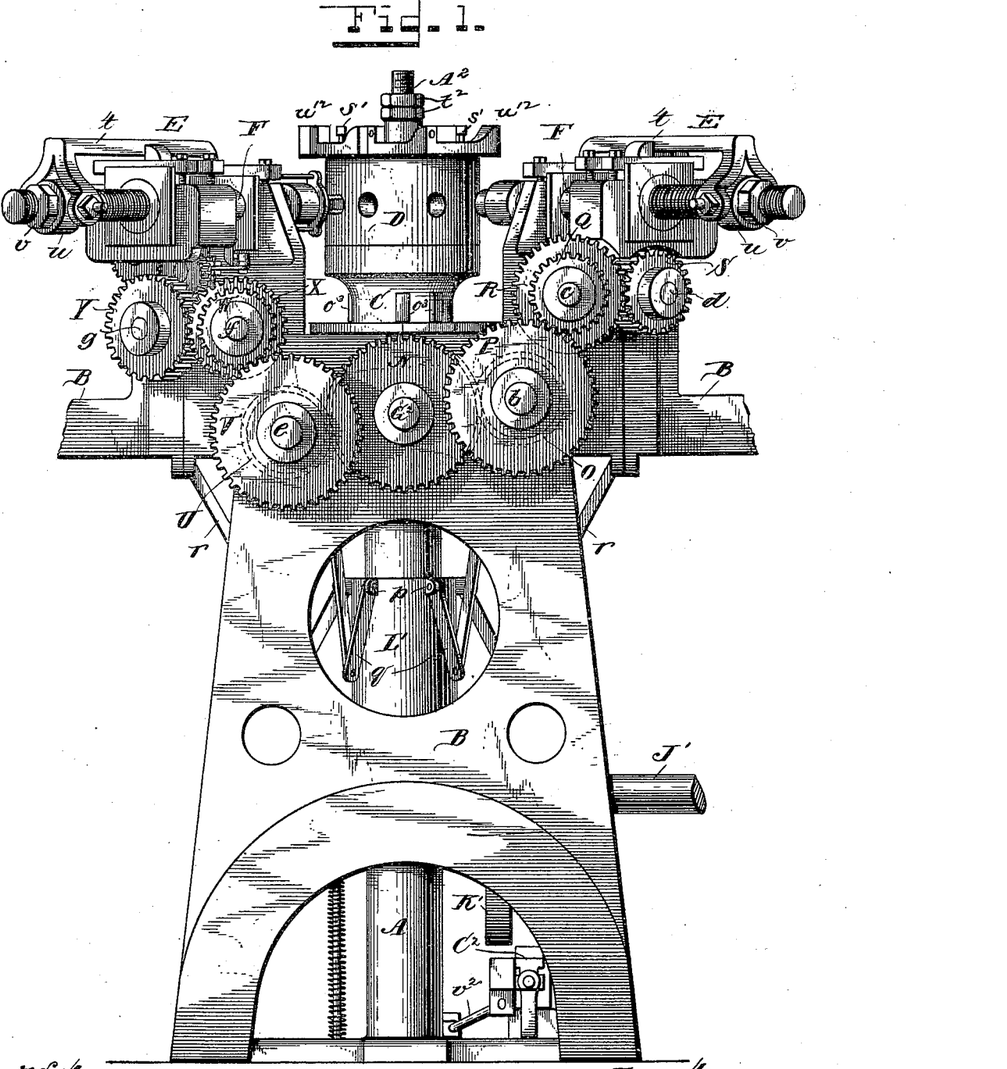
Figure 2:
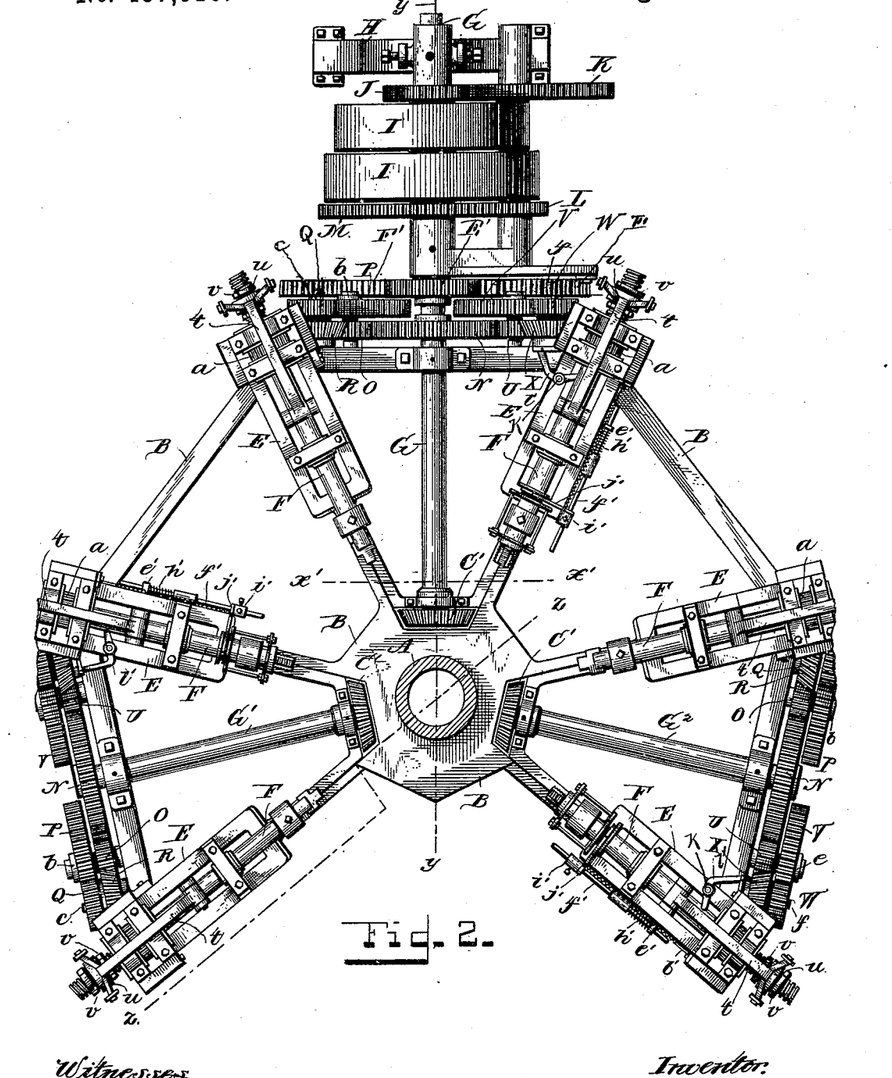
Fig. 2, Sheet 2, is a sectional plan view through the dotted line $x\ x$ of Fig. 3.

A, Figs. 1, 2, 3, and 4, is a central vertical tubular post or standard made rigid to a surrounding polygonal table or frame-work B, properly braced and supported and with a gap or opening at one side, as seen in Fig. 2. Upon the top of the post A (see Fig. 4) is rigidly secured a head-block C, upon which rests and intermittently rotates the monitor-head D, to which are secured the work-carrying chucks, hereinafter described.

Figure 3:
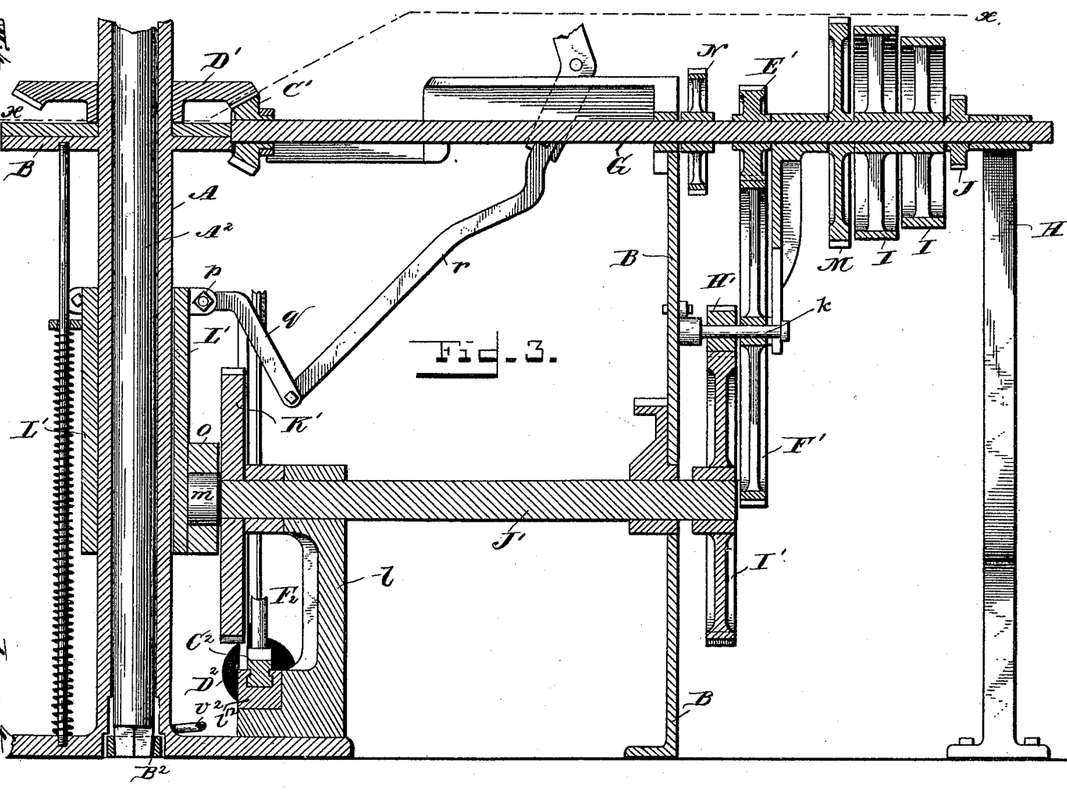
Fig. 3, Sheet 3, is an enlarged sectional elevation through the dotted line $y\ y$ of Fig. 2.
Figures 4, 5:
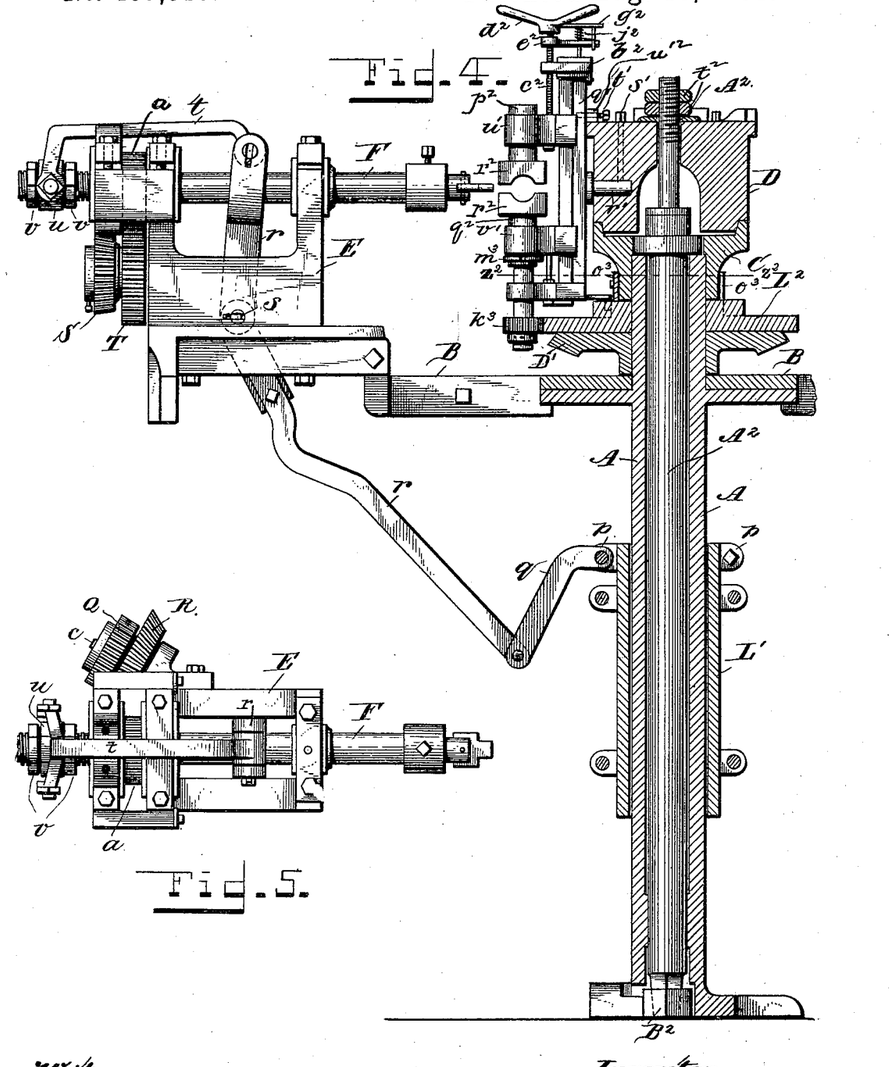
Fig. 4, Sheet 4, is an enlarged elevation, partly in section, through the dotted line $z\ z$ of Fig. 2.
Fig. 5, Sheet 4, is a plan view of the mandrel shown in Fig. 4 and its connections.

Set horizontally and radially upon the table and secured thereto are the head-stocks E, Figs. 1, 2, and 4, in this instance six in number, though there may be more or less, as desired. In each of the head-stocks is journaled, so as to be free to slide therein, a horizontal mandrel F, radial to the monitor-head. These mandrels are simultaneously rotated (see Figs. 2 and 3) in the following manner.

G is the main horizontal driving-shaft journaled in the table and in an outer supplemental frame H. Loosely journaled upon the shaft between the table and frame H are the cone driving-pulleys I and gear J, rigidly secured together. The gear J meshes with a larger gear K, Fig. 2, upon a counter-shaft which carries a smaller gear L, meshing with a larger gear M, fast upon the shaft G; also fast upon the shaft G by the side of the table is a gear N.

Figure 11:
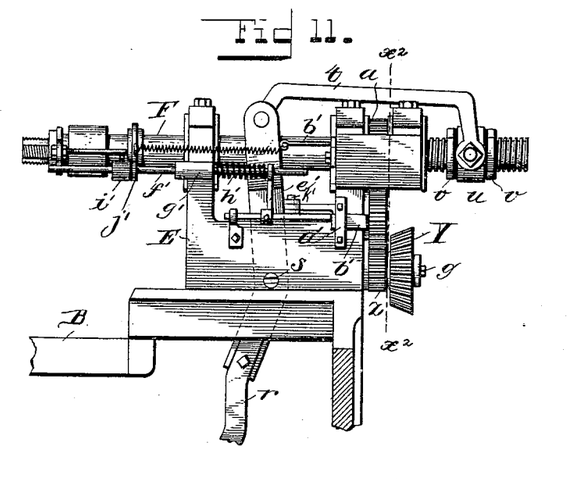
Fig. 11, Sheet 7, is the reverse side elevation of Fig. 9.
Figures 12, 13, 14, 15, 16:
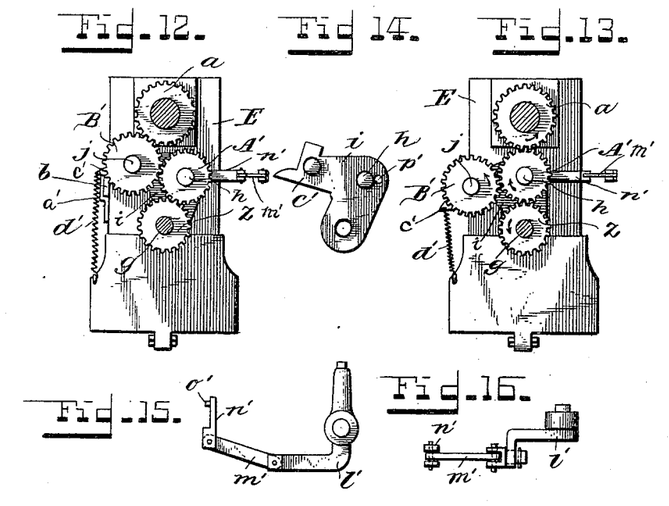
Figs. 12 and 13, Sheet 7, are elevations taken on the dotted line $x^2\ x^2$ of Fig. 11, looking to the left and showing the two positions of the gears when shifted.
Fig. 14, Sheet 7, is a detail of the gear-shifter.
Figs. 15 and 16, Sheet 7, are detail side and plan views, respectively, of the gear-shifter levers.
Figure 17:
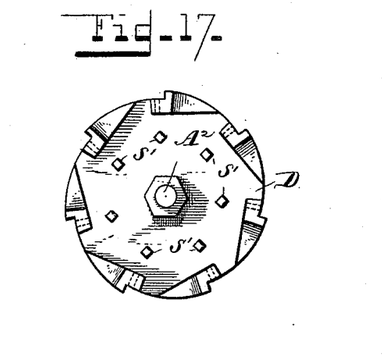
Figs. 17 and 18, Sheet 8, are detail top and bottom views, respectively, of the monitor-head.

The shaft G, it will be observed, is between and equidistant from two of the mandrels, and the gear N meshes on each side with a train of gears, the last of which meshes with a gear $a$, feathered upon each of the mandrels. As the three sets of these gears for rotating all of the mandrels are duplicates of each other and bear the same letters of reference, I would thus describe them, referring to Figs. 1 and 2 and looking toward the center of the machine. On the right the gear N meshes with a gear O, journaled upon a stub-shaft $b$ and carrying a larger gear P, meshing with a smaller gear Q, journaled upon a stub-shaft $c$ and carrying a larger beveled gear R, meshing with a beveled gear S, journaled upon a stub-shaft $d$ and carrying a gear T, Fig. 4, meshing with the feathered gear $a$ upon the right-hand mandrel F. On the left the gear N meshes with a smaller gear U, journaled upon a stub-shaft $e$ and carrying a larger gear V, meshing with a smaller gear W, journaled upon a stub-shaft $f$ and carrying a larger beveled gear X, meshing with a beveled gear Y, journaled upon a stub-shaft $g$ and carrying a smaller gear Z, (see Figs. 11, 12, and 13,) which mesh with a gear A', journaled upon a stub-shaft $h$, projecting from a bell-crank shifter-plate $i$, hung at its lower end upon the shaft $g$ and carrying upon a second stub-shaft $j$ a gear B', constantly meshing with the gear A'. As the bell-crank is shifted by means to be presently described, either the gear A' or the gear B' is caused to mesh with the feathered gear $a$ upon the mandrel F to reverse its direction of revolution.

In addition to the shaft G for driving the pair of mandrels, between which it is located, it will be observed that there are two other radial shafts G' and G², Fig. 2, G' being located between the pair of mandrels to the right of the pair driven by the shafts G and G², between the pair of mandrels to the left of the pair driven by the shaft G. Both of the shafts G' and G² carry at their outer ends gears N, meshing with trains of gears, such as previously described, for rotating the pair of mandrels, between which the shaft G is located, which trains of gears rotate the mandrels between which the shafts G' and G² are located. Each of the shafts G, G', and G² has fast upon its inner end a beveled gear C', meshing with a superimposed beveled gear D', journaled upon the post A, just above the table, (see Figs. 3 and 4,) so that the rotation of the shaft G is imparted to the shafts G' and G², as will be readily understood.

Having described how the mandrels are revolved, I will now describe how they are, with the tools carried upon their inner ends, simultaneously advanced to act upon the work carried by the monitor-head and then simultaneously retracted.

Referring to Fig. 3, it will be seen that there is a gear E' fast upon the shaft G between the gears M N, which meshes with a subjacent larger gear F', journaled upon a counter-shaft $k$ and carrying a smaller gear H', meshing with a larger gear I' upon the outer end of a horizontal shaft J', journaled in the table and in a supplemental bearing-frame $l$. Fast upon the inner end of the shaft J' is a disk K', having a crank or wrist pin $m$, confined in a horizontal slot $n$ (see Fig. 6) in a lateral extension $o$, secured to the lower part of a sleeve L', free to slide vertically upon and surrounding the post A. It will be seen from this construction that the revolution of the shaft J' causes the vertical reciprocation of the sleeve L' upon the post A. Pivoted to lugs $p$ upon the upper end of the sleeve L' are links $q$, six in number, and each having its lower end pivoted to the lower end of each of six levers $r$, (see Figs. 1, 3, 4, and 6,) each of which is pivoted, as at $s$, Fig. 4, in its head-stock E and has its upper end forked and surrounding the mandrel though without touching the same. Pivoted between the upper forked ends of each of the levers $r$ is an arm $t$, having its outer end bent down, forked, and pivoted to a loose collar $u$, held adjustably by nuts $v$ on the threaded end of each mandrel. It results from this construction that as the sleeve L' ascends the upper ends of the levers are thrown outward, and the mandrels F with their tools are retracted, and when said sleeve descends the upper ends of the levers are thrown inward and the mandrels are advanced inward to bring the cutters and taps in contact with the work.

Figure 8:
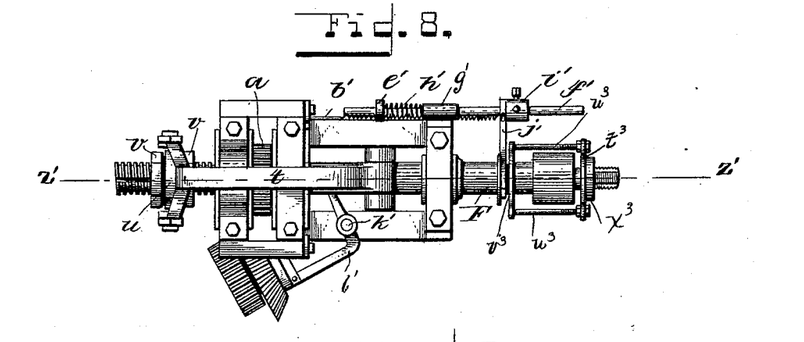
Fig. 8, Sheet 6, is a plan view of one of the mandrels and its connections fitted with automatic reversing mechanism.
Figure 9:
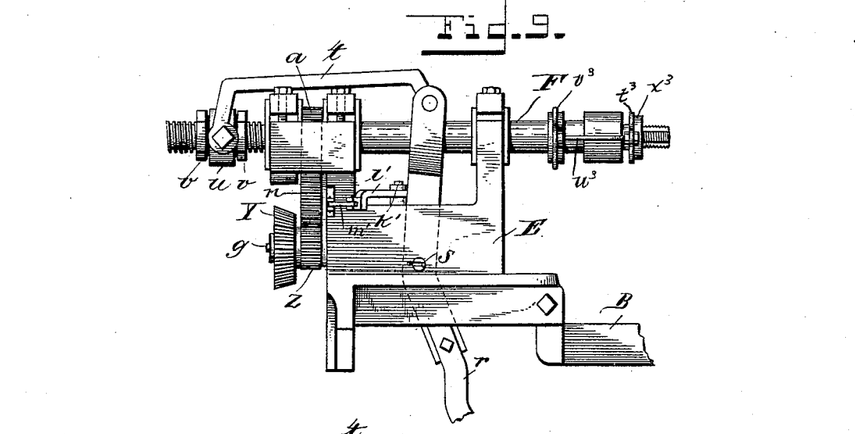
Fig. 9, Sheet 6, is a side elevation of Fig. 8.
Figure 10:
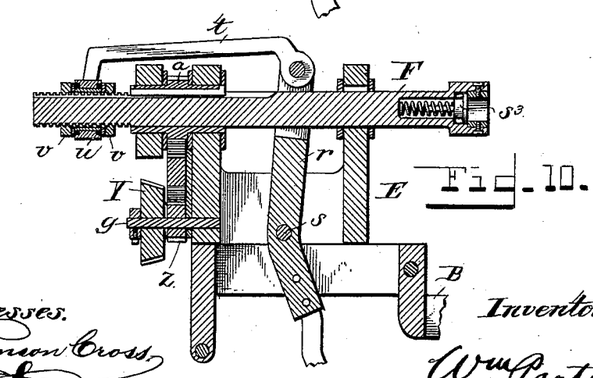
Fig. 10, Sheet 6, is a sectional side elevation through the dotted line $z'\ z'$ of Fig. 8 with the tool-holder and tap removed.

I will now describe the mechanism for automatically reversing the direction of revolution of those mandrels which carry taps, of which three are shown in the present machine, alternating with those carrying cutters or reamers. Those mandrels carrying cutters or reamers do not require to be reversed as they are being retracted, but those carrying taps do, as will be readily understood. By reference to Figs. 8, 9, 11, 12, 13, 14, 15, and 16 this reversing mechanism will be readily understood from the following description: In guides $a'$, Fig. 11, on one side of the head-stock E, is fitted a sliding horizontal latch-piece $b'$, whose outer end engages under a nose $c'$ of the bell-crank shifter $i$ to hold the same up with the gear B', in mesh with the feathered gear $a$ of the mandrel, and with the gear A' out of mesh with $a$. (See Fig. 12.) In this position a coiled spring $d'$, connecting the nose of the shifter $i$ and a fixed part of the frame, as the base of the head-stock, is put under tension. An upwardly-extending arm $e'$, Fig. 11, adjustably secured to the latch-piece, is rigidly secured to a horizontal rod $f'$, guided in a housing $g'$ upon the head-stock. A coiled spring $h'$ surrounds the rod $f'$ between the housing $g'$ and the arm $e'$, and upon the forward end of the rod $f'$ is adjustably secured a collar $i'$, with which, just before the completion of the inward travel of the mandrel and its tap, the forked end of an arm $j'$, Fig. 8, carried by the mandrel, comes in contact, and, locking the rod $f'$ to the mandrel, draws the rod inward, putting the spring $h'$ under tension and withdrawing the latch from under the nose $c'$ of the gear-shifter $i$. As soon as this takes places the spring $d'$, being released, draws down the bell-crank shifter to the position shown in Fig. 13 and throws gear B' out of mesh with gear $a$ and brings gear A' into mesh with $a$, thereby reversing the direction of revolution of the mandrel and tap, as will be readily understood. This withdrawing of the latches of the mandrels having the same takes place just as the upper parts of the levers $r$ begin their backward travel. In the meantime the ends of the latches are held against the inner sides of the nose $c'$, and the springs $h'$ are kept under compressed tension. Pivoted, as at $k'$, Fig. 8, upon the opposite side of each head-stock having the reversing mechanism is a horizontal bell-crank lever $l'$, Fig. 15, whose outer end is connected by a pivoted link $m'$ with a guided slide $n'$, having a pin $o'$ engaging a perforation $p'$, Fig 14, in the shifter $i$, and the parts are so adjusted that just before the upper parts of the levers $r$ reach their extreme outward throw, and just before the mandrels are entirely retracted thereby, the inner ends of the bell-cranks $l'$ are engaged by the levers $r$, and the former are tipped thereby through the medium of the links $m'$ and slides $n'$, drawing back the shifters $i$, bringing them to the position of Fig. 12, and bringing the gears B' again into mesh with the gears $a$, and so again reversing the direction of revolution of the tap-carrying mandrels. As soon as the gear-shifters $i$ have been thus drawn back to the position of Fig. 12 the springs $h'$ are released and throw the latches $b'$ under the noses $c'$ of the shifters $i$ to hold the latter locked until the latches are again withdrawn, as above explained. In this manner the tap-carrying mandrels are revolved to the right as they are advanced to act upon the work, and having cut their threads to the proper depths they are reversed automatically and revolved to the left as they are being retracted. This mechanism is not necessary with the mandrels having cutters or reamers, as before explained, and they can continue to rotate continuously in the same direction as they are advanced and retracted.

I will now proceed to describe the construction of the work-carrying chucks illustrated in Figs. 4, 23, 24, 25, 26, 27, 28, 29, and 30, of which there are vertically secured and bolted to the monitor-head always one more than the number of mandrels in the machine, for a purpose to be hereinafter explained.

Figures 25, 26, 27, 28, 29, 30:
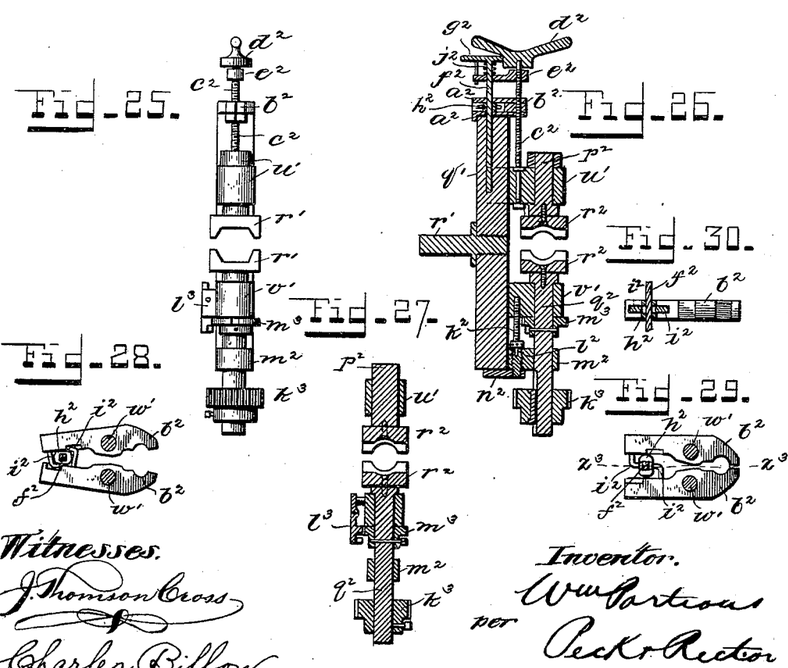
Fig. 25, Sheet 9, is a front elevation of Fig. 23.
Fig. 26, Sheet 9, is a central longitudinal section of Fig. 24.
Fig. 27, Sheet 9, is a sectional detail taken through the dotted line $y^3\ y^3$ of Fig. 24, looking to the left.
Figs. 28 and 29, Sheet 9, are enlarged plan views of the clamping half-nuts in open and closed positions, respectively.
Fig. 30, Sheet 9, is a sectional elevation through the dotted line $z^3\ z^3$ of Fig. 29.
Figure 31:
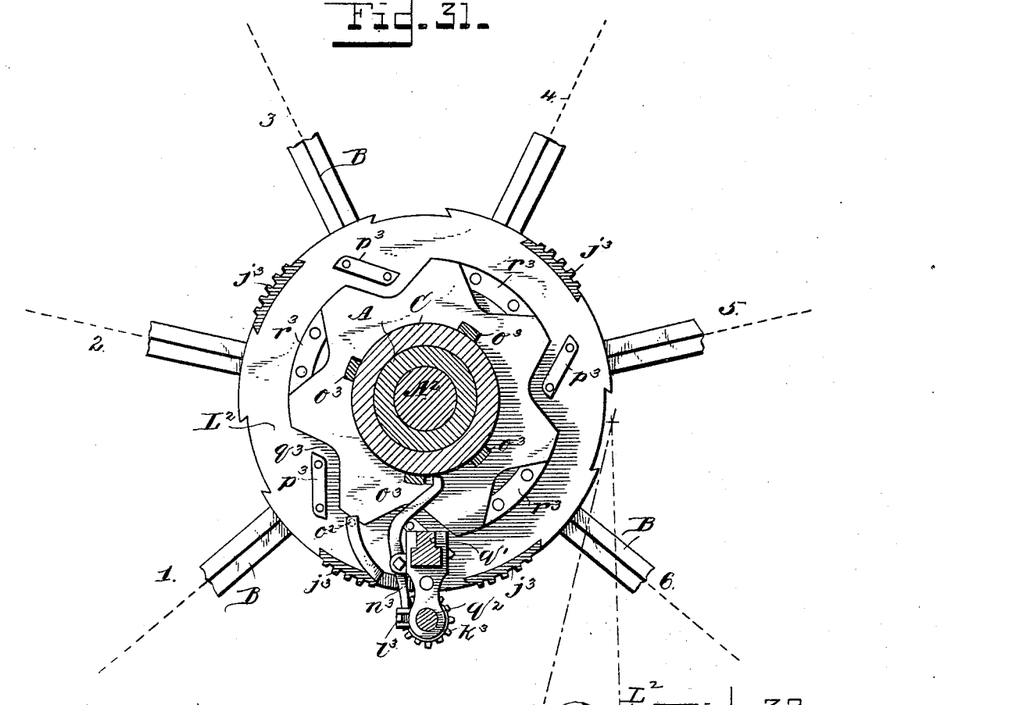
Fig. 31, Sheet 10, is an enlarged detail plan view, partly in section, of the rack and cam mechanism for illustrating its action in rotating the chuck-spindles, taken on dotted lines $z^2\ z^2$ of Fig. 4.
Figure 32:
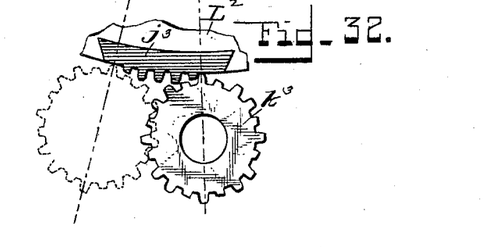
Fig. 32, Sheet 10, is a detail diagram to be referred to in connection with Fig. 31.

The body of the chuck is composed of vertical ribbed portion $q'$ and a rearwardly-projecting centering-pin $r'$, which is confined in one of the bores of the monitor-head and clamped by a set-screw $s'$, (see Fig. 4,) while a second set-screw $t'$ is passed through a rib $u^{12}$ on the upper rim of the monitor-head into the upper vertical portion $q'$. Upon the ribs of the body portion $q'$ are two vertically-adjustable jaw-carriers $u'$ $v'$, the former for the upper and the latter for the lower jaw. Pivoted, as at $w'$, Figs. 28 and 29, between two plates $a^2$, bolted to the top of the portion $q'$, are two half-nuts $b^2$, whose forwardly-projecting threaded ends normally engage a screw $c^2$, whose lower end is fast to though free to turn in the upper jaw-carrier and whose upper end is provided with a handle $d^2$. In a rearwardly-extending cross-piece $e^2$, carried by the screw $c^2$ just beneath the handle, is carried the upper end of a rod $f^2$, provided at its upper end with a handle $g^2$ and free to slide vertically in a recess in the portion $q'$. This rod is polygonal in section and passes through a hub $h^2$, journaled in and between the plates $a^2$ and between the rear ends of the half-nuts. The hub $h^2$ is shaped to act as a cam upon hooks $i^2$, fast to the inner rear sides of the half-nuts, so that when the rod is turned, as seen in Fig. 28, the half-nuts are spread apart and disengaged from the screw $c^2$. While in this position the upper jaw-carrier can be raised and lowered by hand. A coiled spring $j^2$, surrounding the rod $f^2$, and fast at one end to said rod and at the other to the piece $e^2$, is put under tension when the rod $f^2$ is turned to spread the half-nuts, and when the jaw-carrier has been shifted and the handle $g^2$ released said spring returns rod $f^2$ and the hub $h^2$ re-engages with the ends of the hooks $i^2$ to cause the half-nuts to re-engage with the screw $c^2$. The lower jaw-carrier $v'$ is operated for vertical adjustment by a screw $k^2$, whose lower end, provided with a turning collar, is stepped into a quick pitched screw $l^2$, passed through and engaging with a foot-piece $m^2$ upon the lower forward end of the portion $q'$. An arm $n^2$ is connected to the lower end of the screw $l^2$, and has upon its under inner side a pin or roller $o^2$, for a purpose to be presently explained. Journaled respectively in the upper jaw-carrier and in the lower jaw-carrier and foot-piece $m^2$ are the two concentric vertical jaw-spindles $p^2$ $q^2$, each carrying upon its adjacent ends the detachable jaws $r^2$, between which the work is clamped or chucked by bringing the upper jaw down upon it and tightening the screw $c^2$.

I will now describe how the monitor-head, with its work-carrying chucks, is intermittently rotated, reference being had to Figs. 3, 4, 6, 7, 18, 19, 20, and 22. Journaled in the post A is a vertical shaft $A^2$, extending up through a central perforation in the monitor-head and with locking-nuts $t^2$ upon its upper threaded end. Upon the lower end of this shaft is a crank-arm $B^2$, with an extension $u^2$, Fig. 7, projecting through a cut-away portion of the post A. A pivoted link $v^2$ connects the extension $u^2$ with a lateral projection on the rear of a horizontal slide-bar $C^2$ guided in the supplemental bearing-frame $l^{12}$ and in a bearing $w^2$ and having its forward end connected to a weight $D^2$ by a cord $E^2$, passed over guide-pulleys $F^2$, journaled on a supplemental frame $H^2$. A bell-crank dog $I^2$ is pivoted to the outer face of the disk $K'$, Fig. 6, and is so arranged that at each revolution of the disk and just as the mandrels have been retracted (see dotted lines, Fig. 6) its outer projecting end comes in contact with a shoulder $a^3$ upon the slide $C^2$ and forces the latter back, thereby partially turning the shaft $A^2$ and lifting the weight $D^2$. As soon as the nose of the dog passes or slips over the shoulder $a^3$ the weight $D^2$ draws the slide $C^2$ back again, and thereby turns the shaft $A^2$ back to its former position, as will be readily understood. In this way the shaft is given its oscillation.

$J^2$ is a stationary trip for throwing the dog $I^2$ out in proper engaging position and holding it there, and $K^2$ is a stop-pin against which it is held while engaging with the shoulder $a^3$. A stationary projection from the periphery of the disk $K'$ might, however, be substituted for the pivoted dog $I^2$ with the same results. This modification is shown in Fig. 6a, in which $I^{12}$ denotes the stationary projection referred to.

Figure 18:
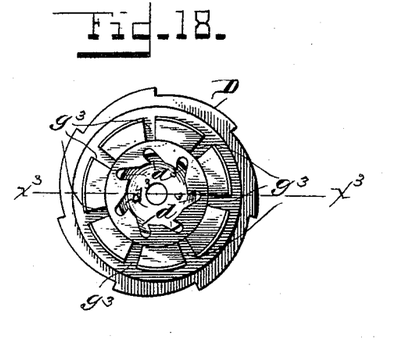
Figure 19:
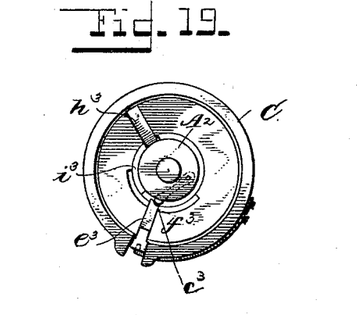
Fig. 19, Sheet 8, is a plan of the monitor-head support.
Figure 20:
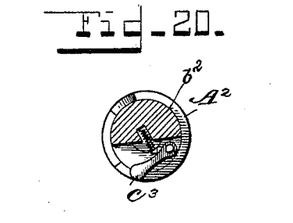
Fig. 20, Sheet 8, is a sectional detail in plan through the dotted line $y^2\ y^2$ of Fig. 22.
Figure 21:
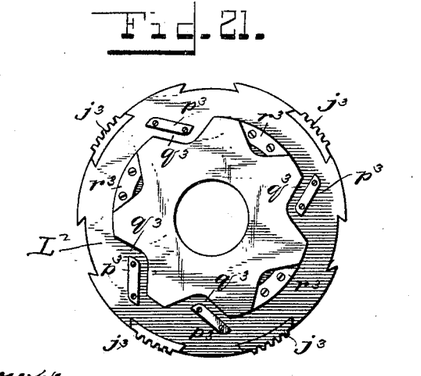
Fig. 21, Sheet 8, is a detail plan view of the cam and rack disk.
Figure 22:
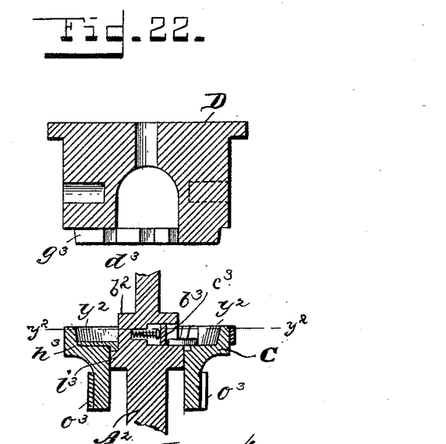
Fig. 22, Sheet 8, is a detail sectional view taken on the dotted line $x^3\ x^3$ of Fig. 18, with the monitor-head lifted.
Figure 23:
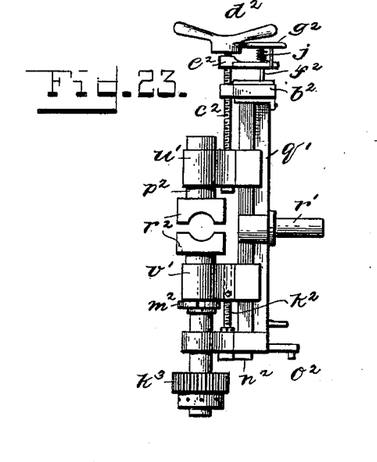
Fig. 23, Sheet 9, is a side elevation of one of the work-holding chucks.
Figure 24:
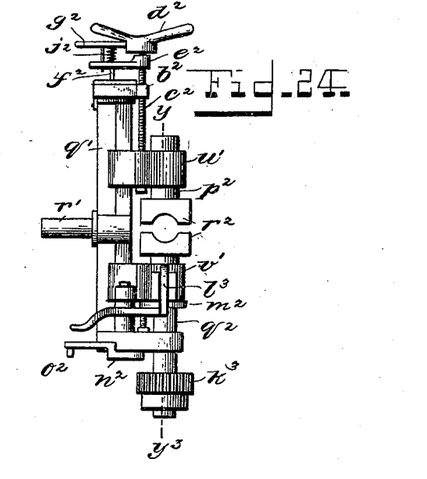
Fig. 24, Sheet 9, is a reverse view of Fig. 23.

Recessed in a collar $b^2$, Figs. 19, 20, and 22, is a pivoted spring-projected dog or pawl $c^3$, which engages with ratchet-depressions $d^3$, Fig. 18, on the lower inner side of the monitor-head. Just before entering one of these depressions to turn the monitor-head the nose of the dog engages the end of a spring-latch $e^3$, Fig. 19, whose nose $f^3$, recessed and guided in the head-block C, normally engages one of a series of recesses $g^3$ in the monitor-head to hold the same locked and presses it out, thereby breaking the lock until the monitor-head has been turned by the forward oscillation of the shaft $A^2$, whereupon on the return stroke of the shaft the nose $f^3$ enters the next recess $g^3$ to relock the monitor-head. As the shaft $A^2$ is brought back by the weight $D^2$ it is wedged down by a plate $h^3$, Figs. 19 and 22, secured to the head-block C, and projecting over an inclined collar $i^3$ upon the shaft, thereby aiding the latch $e^3$ in securely locking the monitor-head.

The means for automatically unlocking, turning, and relocking the chuck-spindles will be understood from the following description, referring to Figs. 4, 21, 31, and 32. Locked upon the post A, just under the head-block C, is a disk $L^2$, having detachably secured in recesses in its edge segment-racks $j^3$, of which there are four in the present instance. These racks lie in the path of travel of pinions $k^3$, one upon each of the lower ends of the lower chuck-spindles, so that as the monitor-head is being turned (see Fig. 32) these racks rotate the pinions, and with them the chuck-spindles, thereby giving the work held by the chuck-jaws a quarter-turn. Just before the pinions come in contact with the racks a pivoted spring-latch $l^3$, Figs. 24, 27, and 31, for each chuck is disengaged from a notched collar $m^3$ upon the lower chuck-spindle by a pivoted lever $n^3$, whose inner end is caught by one of a series of lugs or projections $o^3$ on the head-block C, thereby tripping the lever and releasing the latch of each chuck. At the same time each of the rollers or pins $o^2$ on the levers $n^2$ is caught by a cam $p^3$ and caused to enter a depression $q^3$ in a collar on the disk $L^2$, which tilts the levers $n^2$ and lowers the quick-screw $l^2$, thereby loosening the chuck-spindles sufficiently to permit of their being freely turned. Before the chucks come to rest the depressions $q^3$ will have returned the levers $n^2$ and reclamped the chuck-jaws.

Figure 33:
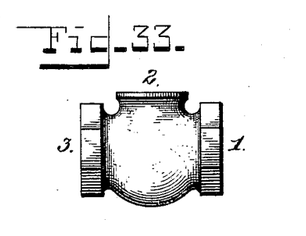
Fig. 33, Sheet 10, is a plan of an ordinary globe-valve body as an illustration of one of the articles to be dressed in the machine.

It will be noticed that there are seven cam-depressions $q^3$ and that three alternate ones are bridged by removable segment-pieces $r^3$. The reason for this is that in dressing an ordinary valve like Fig. 33 the valve is put into the chuck-jaws with its seat-opening pointing into the center of the machine. The chuck occupies the position shown in Fig. 31. Now as the monitor-head turns for the first time to bring this chuck opposite the line of man-